United States Patent
Isoda (10) Patent No.: US 7,143,172 B2
(45) Date of Patent: Nov. 28, 2006

(54) COMMUNICATION CONTROL FOR MULTI-LAYER COMMUNICATIONS

(75) Inventor: Takashi Isoda, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 10/635,567

(22) Filed: Aug. 7, 2003

(65) Prior Publication Data

US 2004/0039824 A1    Feb. 26, 2004

Related U.S. Application Data

(63) Continuation of application No. 09/357,976, filed on Jul. 21, 1999, now Pat. No. 6,665,719.

(30) Foreign Application Priority Data

Jul. 21, 1998    (JP)    ................. 10-205081

(51) Int. Cl.
*G06F 13/00* (2006.01)
(52) U.S. Cl. ....................... 709/227; 709/225; 709/250
(58) Field of Classification Search ................ 709/203, 709/217, 223, 225, 227, 228

See application file for complete search history.

(56) References Cited

U.S. PATENT DOCUMENTS

| | | | | |
|---|---|---|---|---|
| 5,027,269 | A | * | 6/1991 | Grant et al. ................. 709/224 |
| 5,546,382 | A | | 8/1996 | Fujino ......................... 455/405 |
| 5,867,636 | A | | 2/1999 | Walker ....................... 395/114 |
| 6,085,247 | A | | 7/2000 | Parsons, Jr. et al. ........ 709/227 |
| 6,160,843 | A | * | 12/2000 | McHale et al. ............. 375/222 |
| 6,233,543 | B1 | | 5/2001 | Butts et al. .................. 703/27 |
| 6,298,060 | B1 | | 10/2001 | Miyakawa et al. ......... 370/400 |
| 6,341,312 | B1 | | 1/2002 | French et al. ............... 709/227 |

* cited by examiner

*Primary Examiner*—Viet D. Vu
(74) *Attorney, Agent, or Firm*—Fitzpatrick, Cella, Harper & Scinto (57) ABSTRACT

A communication control apparatus re-establishes connection of a line when a user disconnects the line by mistake during the transmission of data. When a lower layer is disconnected while data is being transmitted to another apparatus, an upper layer is controlled to maintain a session for a predetermined period of time, and when a line connection is re-established within the predetermined period of time, a connection is established for the transmission of data.

21 Claims, 9 Drawing Sheets

COMMUNICATION CONTROL FOR MULTI-LAYER COMMUNICATIONS

This application is a continuation of application Ser. No. 09/357,976, filed Jul. 21, 1999, now U.S. Pat. No. 6,665,719.

BACKGROUND OF THE INVENTION

1. Field of the Invention

The present invention relates to processing performed to remove an abnormality on a data communication line, and to a printing process for the transmission of data along, for example, an IEEE 1394 line.

2. Related Background Art

Since for the performance of a communication process across a so-called centronics line only an image data source and a printer are connected together, basically, even when a physical line is disconnected, the canceling of a session is not required unless a user physically breaks the connection. And when data are being transmitted to other apparatuses, if a lower layer is disconnected from a line, accordingly an upper layer is immediately disconnected from the line.

Assume that, as provided for by the IEEE 1394 specification, a plurality of image data sources and a plurality of printers are connected together along a single, closed communication line. If, for example, one of the image sources that is connected to the line and that is transmitting data is disconnected, and if a printer that during a session communicates with that image data source continues to be connected to the source, as with a centronics line, the printer will be unable to transmit data to other image data sources on the line.

If an upper layer is disconnected immediately after a lower layer is disconnected, or if the disconnection and the re-connection of a line is performed due to the careless performance of an operation by a user or due to a rearrangement of apparatuses, the printing process must be repeated from the beginning. As a result, an undesirable, excessive expenditure of time, paper and ink (toner, etc.) occurs.

SUMMARY OF THE INVENTION

It is, therefore, one objective of the present invention to provide a communication control apparatus and a communication control method for re-connecting a system that, during a data transmission session, has been disconnected from a line due to the careless performance of an operation by a user, and a storage medium therefor.

To achieve the above objective, according to the present invention, a communication control apparatus comprises:

control means for, if a lower layer is disconnected while data is being transmitted to an apparatus, permitting an upper layer to continue to maintain a session for a predetermined period of time, and for, if a line connection is re-established within the predetermined period of time, permitting the upper layer to establish a connection for the transmission of data.

Further, according to the present invention, a communication control method comprises:

a control step for, if a lower layer is disconnected while data is being transmitted to an apparatus, permitting an upper layer to continue to maintain a session for a predetermined period of time, and for, if a line connection is re-established within the predetermined period of time, permitting the upper layer to establish a connection for the transmission of data.

Furthermore, according to the present invention, provided is a storage medium, on which is stored a communication control program, the communication control program comprising:

a control step for, if a lower layer is disconnected while data is being transmitted to an apparatus, permitting an upper layer to continue to maintain a session for a predetermined period of time, and for, if a line connection is re-established within the predetermined period of time, permitting the upper layer to establish a connection for the transmission of data.

BRIEF DESCRIPTION OF THE DRAWINGS

FIG. 5 which is composed of FIGS. 5A and 5B are flowcharts showing the processing performed by the host computer when the printer is disconnected from a bus during the transmission of print data;

DETAILED DESCRIPTION OF THE PREFERRED EMBODIMENTS

The preferred embodiments of the present invention will now be described in detail while referring to the accompanying drawings.

(First Embodiment)

Figure 1:
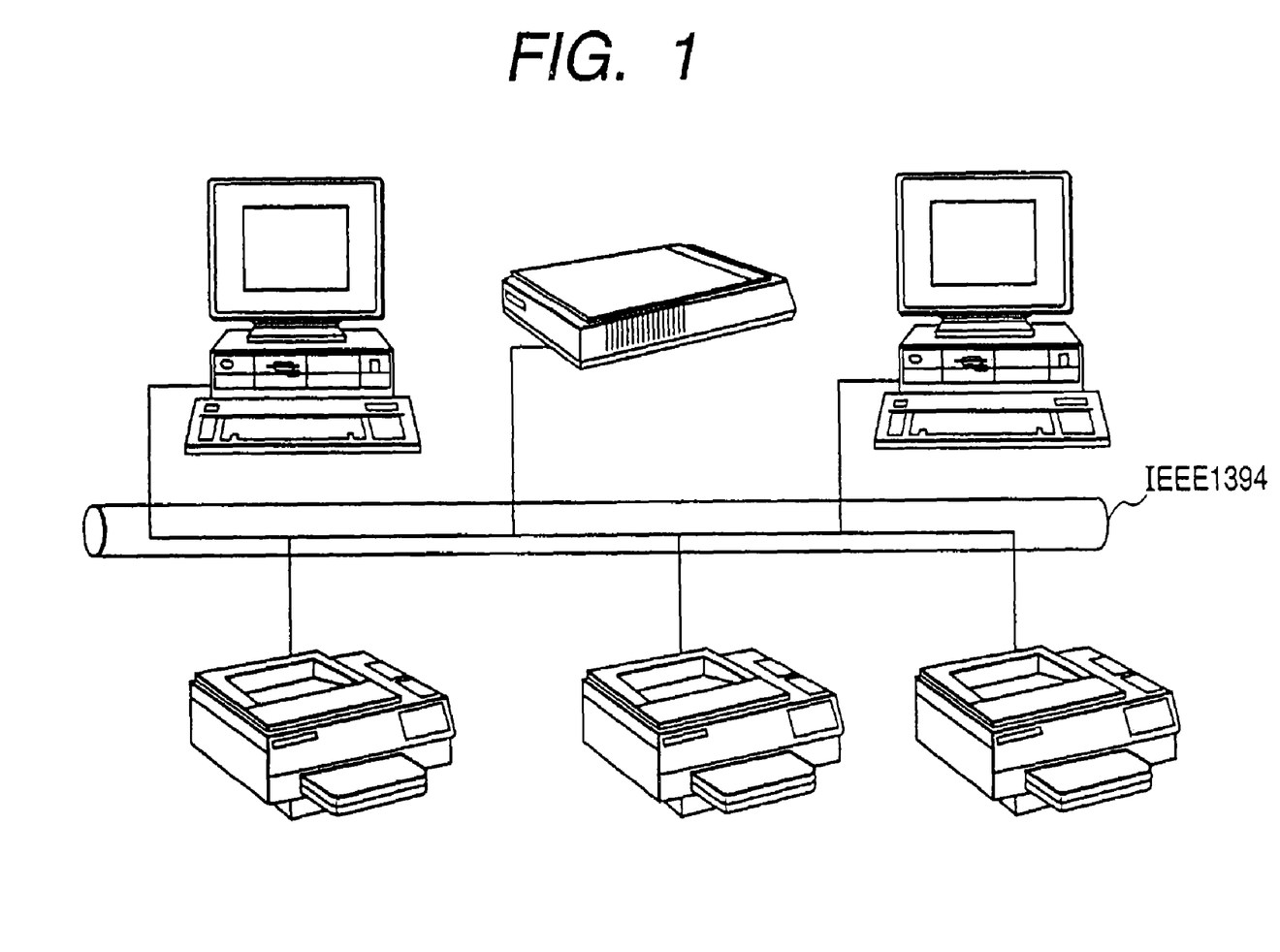
FIG. 1 is a diagram showing an example system configuration for which the present invention can be applied.

FIG. 1 is a diagram showing an example system configuration for which the present invention is applied.

Figure 2:
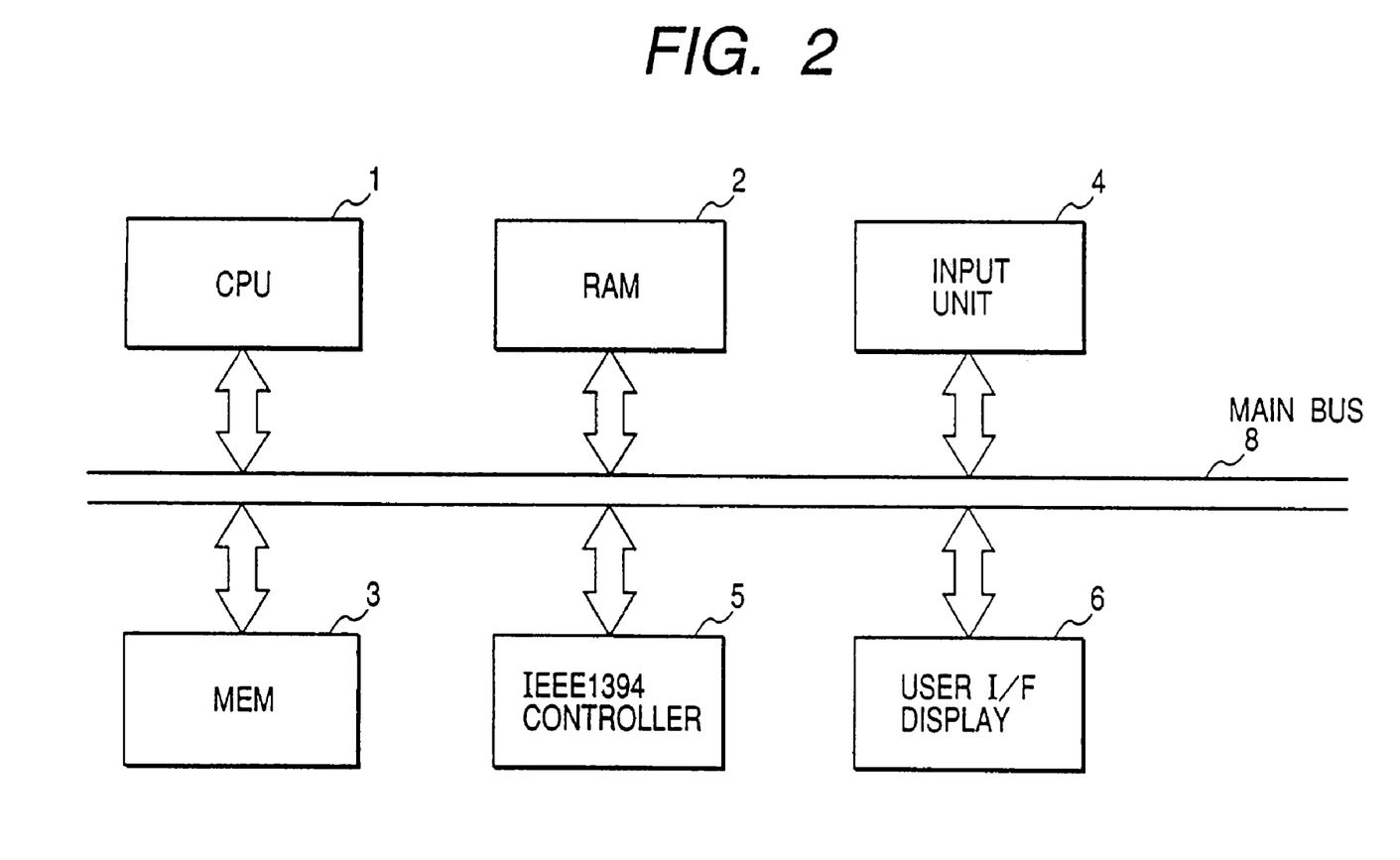
FIG. 2 is a hardware block diagram showing a host computer according to one embodiment of the present invention.

FIG. 2 is a block diagram illustrating the internal components of a host computer shown in FIG. 1. The host computer comprises: a CPU 1, for controlling the overall operations of a host computer of the present invention; a RAM 2, used as a work area for the CPU 1; a memory (a hard disk, a floppy disk, or a CD-ROM) 3 in which control programs, including those for flowcharts in FIG. 4 and FIGS. 5A and 5B of the present invention, are stored; an input unit (specifically, a mouse or a keyboard) 4, used by a user to enter a command; an IEEE 1394 controller 5; a user I/F display 6, specifically a display device; and a main bus 8.

Figure 3:
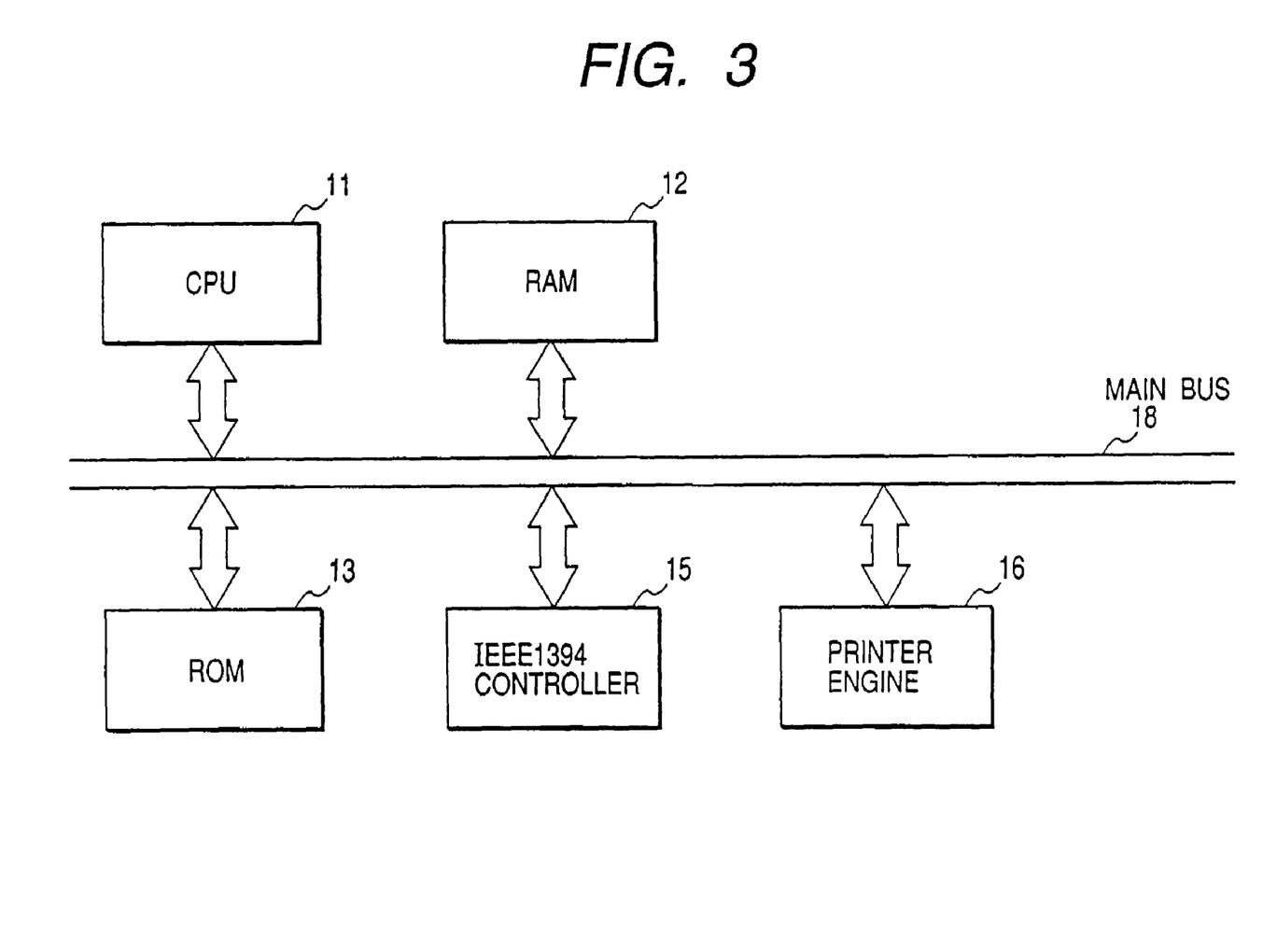
FIG. 3 is a hardware block diagram showing a printer according to one embodiment of the present invention.

FIG. 3 is a block diagram illustrating the internal components of a printer in FIG. 1. The printer comprises: a CPU 11, for controlling the printer; a RAM 12, used as a work area for the CPU 11; a ROM (a floppy disk, a CD-ROM or a hard disk) 14, in which are stored control programs, including those for the flowcharts in FIGS. 6 and 7 for the present invention; an IEEE 1394 controller 15; a printer engine 16; and a main bus 18.

It should be noted that, even though not specifically described, in the host computer the CPU 1 controls the RAM 2, the memory 3, the input unit 4, and the IEEE 1394 controller 5, via the main bus 8. In the printer, the CPU 11 controls the RAM 12, the ROM 13, the IEEE 1394 controller 15, and the printer engine 16, via the main bus 18.

In the host computer, the processing to be performed in accordance with the present invention is divided into a print data transmission program and a bus reset interrupt processing program. In the printer, the processing to be performed in accordance with the present invention is divided into a print data reception program and a bus reset interrupt processing program.

It is assumed that SBP-2 is automatically logged out when a specified apparatus is disconnected from the bus.

Figure 4:
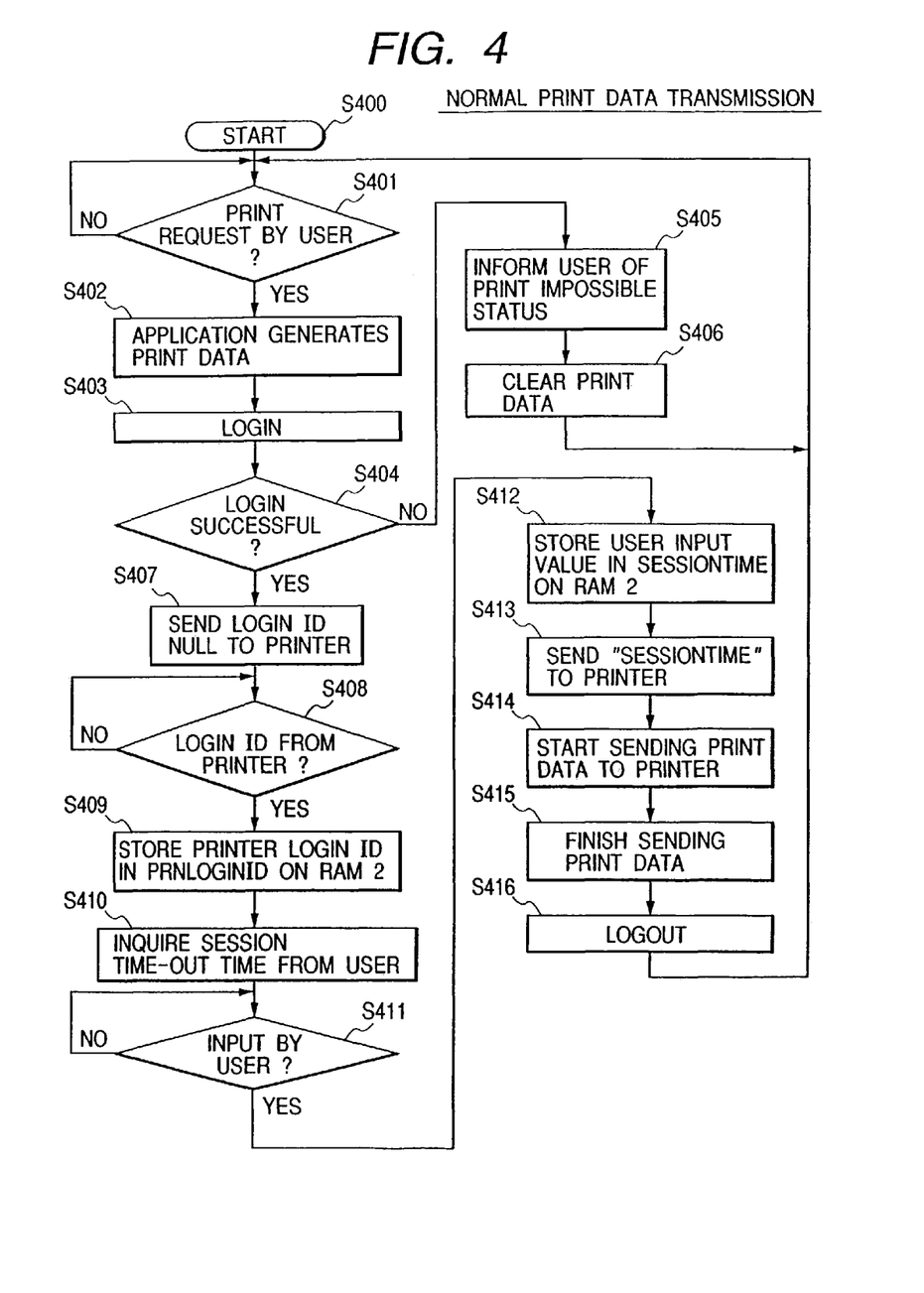
FIG. 4 is a flowchart showing a print data transmission program.

The print data transmission program for the host computer will now be described while referring to FIG. 4.

First, the program waits for print data to be prepared and for a printing request to be issued by a user (S401).

When a printing request is issued, an application in the host computer produces additional print data based on the data prepared by the user (S402). To initiate the transmission of data to the printer, a login process for the printer is performed in accordance with the rules established for SBP-2 by the IEEE 1394 controller 5 connected to the IEEE 1394 line (S403). A check is then performed to determine whether the login was successful (S404). If the login was not successful, it is assumed that the operating condition of the printer is abnormal or that the printer is busy, and a user is notified via the user I/F display 6 that the printer can not be used at the present (S405). Thereafter, the print data that were prepared are cleared (S406).

If the login was successful, however, login identifier "NULL" is transmitted along the IEEE 1394 line, via the IEEE 1394 controller 5, to the printer, in order to notify the printer that a new printing request has been received (S407). Then, the program waits for the reception of a login identifier that is issued by the printer relative to the printing request (S408). Upon receiving the login identifier, its value is stored in a "PRNLOGINID" area in the RAM 2 (S409). Thereafter, the user is requested to enter the time for the session time-out via the user I/F display 6 (S410). The program then waits for the user to employ the input unit 4 to enter the time for the session time-out (S411). When the user enters the time, its value is stored in a "SESSIONTIME" area in the RAM 2 (S412), and the value stored in the "SESSIONTIME" area in the RAM 2 is transmitted via the IEEE 1394 controller 5 and the IEEE 1394 line to the printer (S413). Then the transmission of the print data to the printer is begun via the IEEE controller 5 and the IEEE 1394 line (S414). When the printer data have been transmitted, the data transmission process is terminated (S415), and by logging out the printer, which is performed in accordance with the rules established for SBP-2, the communication process is also terminated (S416). Then, the process at step S401 is performed while the program waits for the next printing request.

Figures 5, 5A:
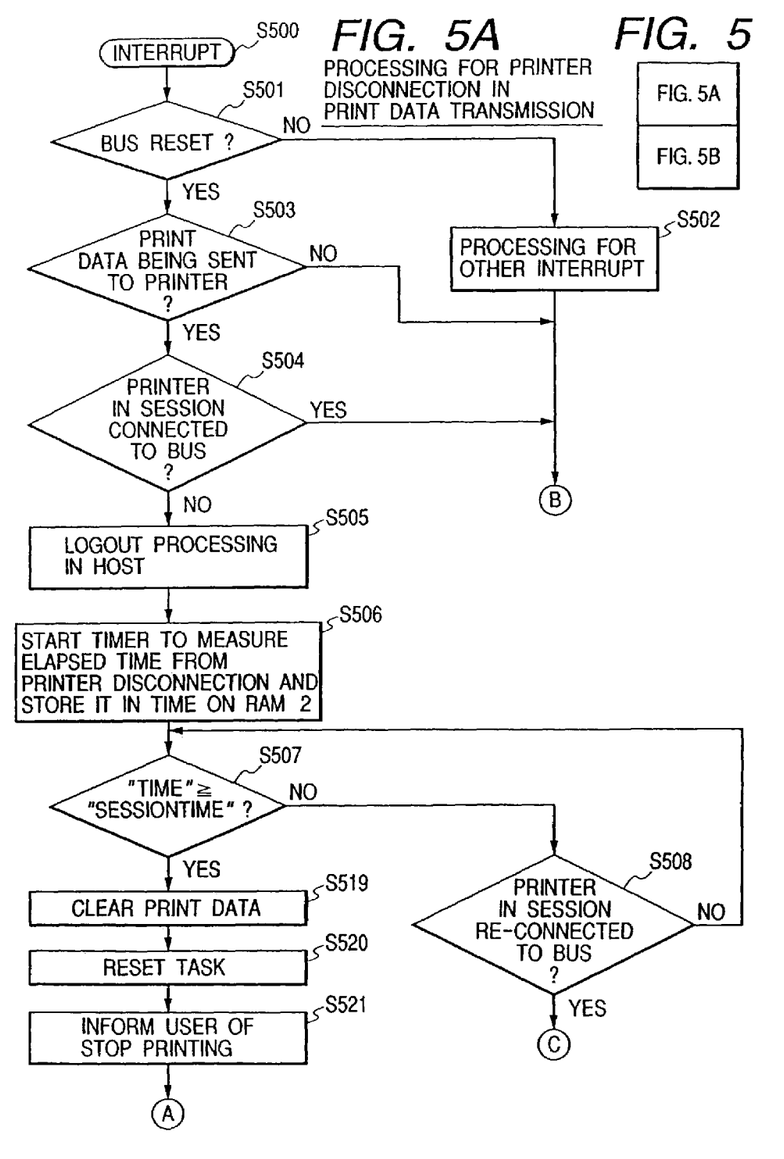
Figure 5B:
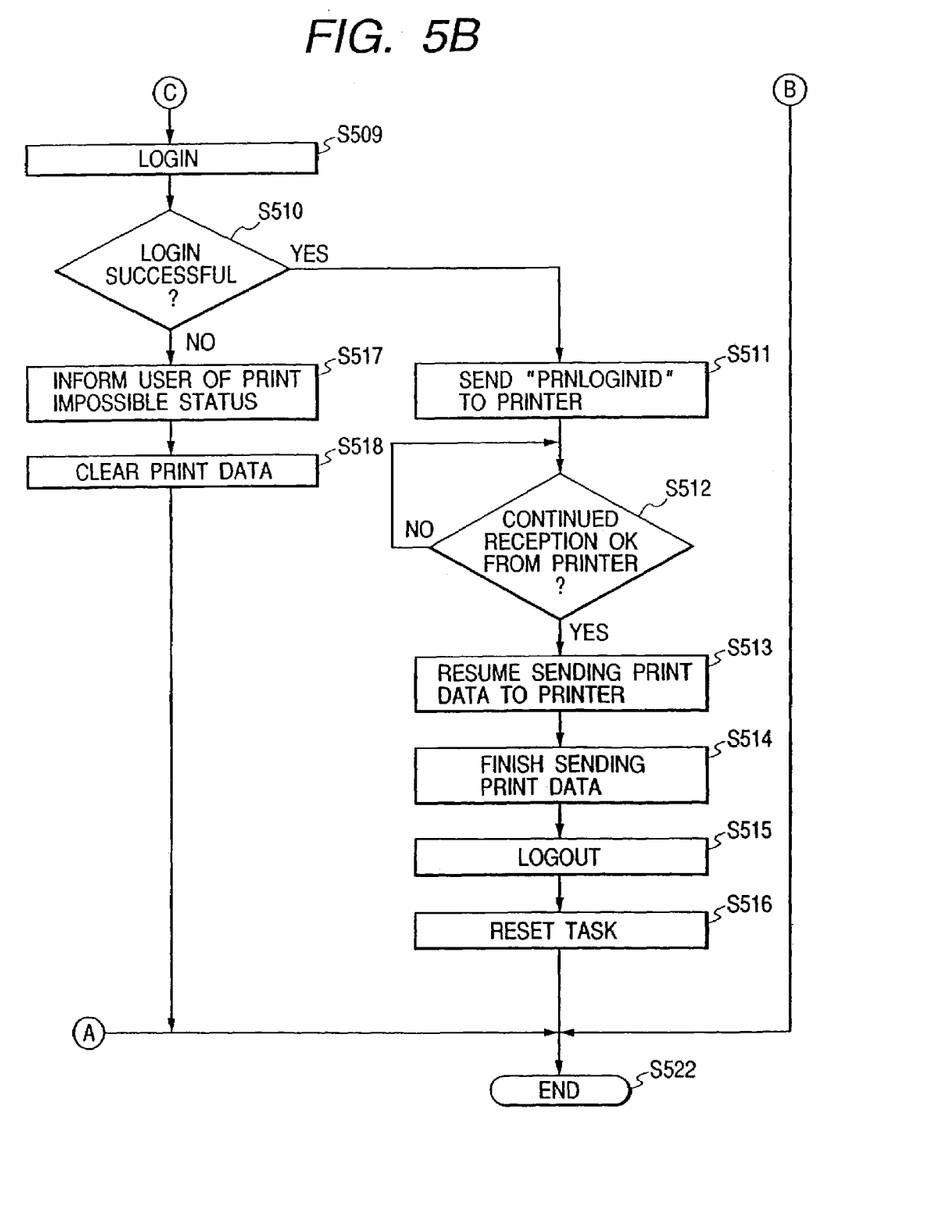

An explanation will now be given, while referring to FIGS. 5A and 5B, for the processing performed by the host computer when the printer is disconnected from the IEEE 1394 line while print data are being transmitted.

This processing is performed in accordance with a host computer interrupt program that is initiated by an IEEE 1394 bus reset.

Figure 8:
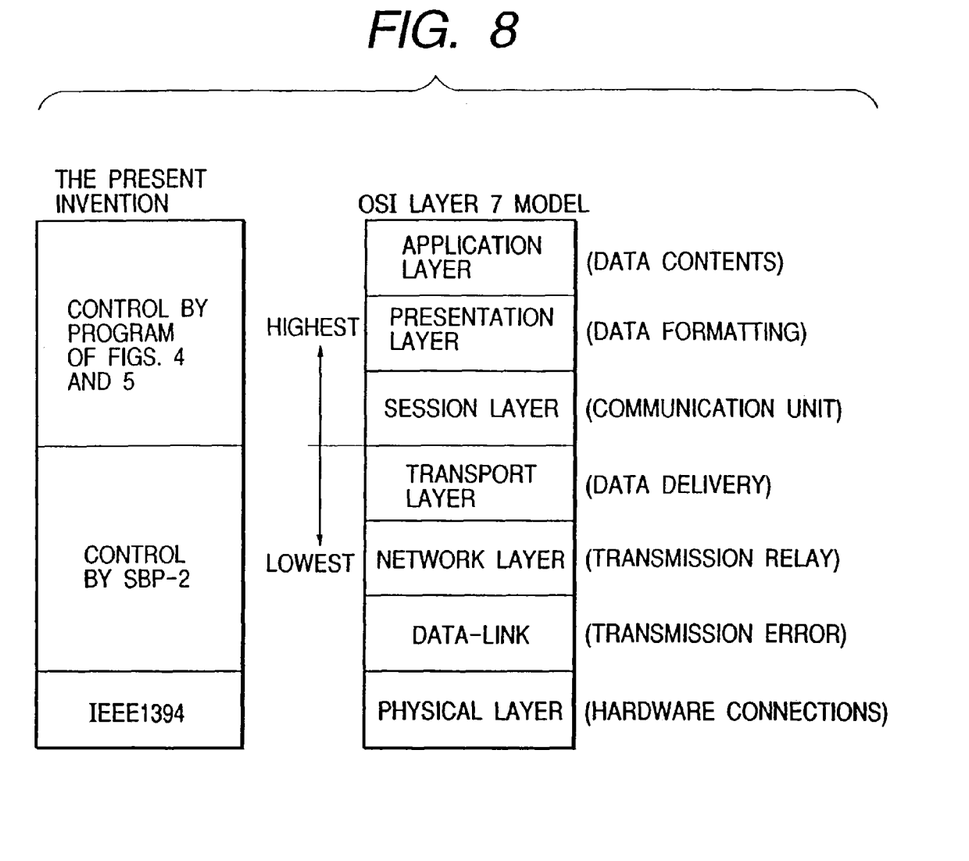
FIG. 8 is a diagram showing the relationship between an OSI seven layer model and the present invention.

When an interrupt occurs (S500), a check is performed to determine whether the interrupt is the result of an IEEE 1394 bus reset at a lower layer shown in FIG. 8 (a lower layer detects the disconnection of a line, or the connection of a new apparatus to a line, and performs a line disconnection) (S501). If the interrupt is not the result of a bus reset, an interrupt routine that corresponds to the reason for the interrupt is activated and the appropriate processing is performed (S502). The processing is thereafter terminated (S522). If the interrupt is the result of a bus reset, a check is performed to determine whether print data are currently being transmitted to the printer (S503). When print data are not being transmitted, it is assumed that there is no event to be processed, and the interrupt process is terminated (S522).

When print data are being transmitted, a check is performed to determine, via the IEEE 1394 controller 5 on the IEEE 1394 line, whether a printer in a session is currently connected to the bus (S504). If the printer in the session is connected, it is assumed that the bus reset does not adversely affect the communications performed by the printer and the interrupt process is terminated (S522). If the pertinent printer is not connected, it is assumed that the printer that is receiving data is not connected to the bus, and a logout process for the internal communication performed by the host computer (an abnormality end process) is performed (S505). The timer for the host computer is started and measures the elapsed time since the printer was disconnected from the bus (S506). The elapsed time is stored in an area "TIME" in the RAM 2. A value in "TIME" is then compared with a value in "SESSIONTIME" (S507).

When the value in "TIME" is ≧the value in "SESSIONTIME", it is assumed that the session time has expired, and print data stored in the host computer are cleared (S519) and all the tasks associated with the transmission of print data are initialized (S520). Then, the user is notified via the user I/F display 6 that printing has been halted (S521). The processing is thereafter terminated (S522).

When the value in "TIME" is <the value in "SESSIONTIME", it is assumed that the session time has not yet expired, and a check is performed to determine whether the printer in the session has been reconnected to the bus (S508). If the printer has not yet been re-connected, the process at step S507 is repeated.

When the printer in use during the session has been re-connected, the login of the printer in the session is again performed in accordance with the rules established for SBP-2 (S509). A check is thereafter performed to determine whether the login has been successful (S510). If the login has not been successful, it is assumed that an abnormality has occurred at the printer, and the user is notified via the user I/F display 6 that the printer can not presently be used (S517). Thereafter, print data stored in the host computer are cleared (S518), and all the tasks associated with the transmission of print data are initialized. If the login has been successful, however, a login ID that is stored as a login identifier in area "PRNLOGINID" is transmitted along the IEEE 1394 line via the IEEE 1394 controller 5 (S511), and reception of permission for continuous reception by the printer is waited for (S512). If permission for continuous reception is not received, the printer is logged out to clear the print data, and all the tasks concerning the transmission of print data are initialized. But when continuous reception is permitted, transmission of print data to the printer is resumed (S513). When the print data have been transmitted, the transmission process is terminated (S514) and the logging out of the printer is performed in accordance with the rules established for SBP-2 for the termination of communication (S515). Then all the tasks associated with the transmission of print data are initialized (S516). The processing is thereafter terminated (S522).

Figure 6:
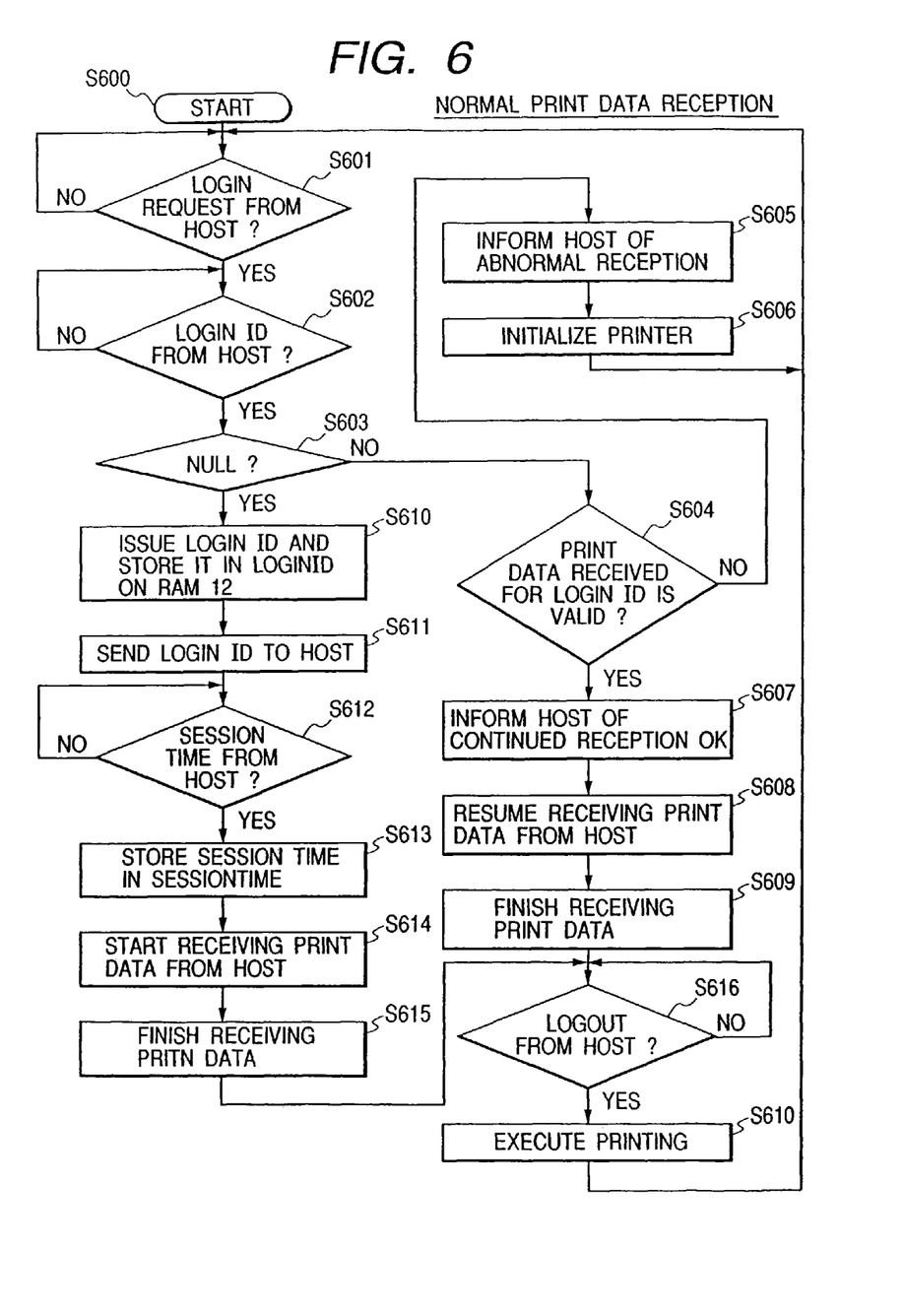
FIG. 6 is a flowchart showing the processing performed when the operating condition of the printer is normal.

The processing for receiving print data when the printer is operating normally will now be described while referring to FIG. 6.

A check is performed to determine whether a login request output along the IEEE 1394 line by the host computer has been received via the IEEE 1394 controller 15 (S601). When a login request has been received, sequentially, checks are performed to determine whether a login identifier has been received (S602), and when one is received, whether the received identifier is a "NULL" (S603). If the login identifier is a "NULL", it is assumed that the received request is a new printing request, and a new login identifier is issued and is stored in area "LOGINID" in the RAM 12 (S604). Thereafter, the login identifier is transmitted to the host computer (S611) and the reception of a session time from the host computer is waited for (S612). When the session time is received, its value is stored in area "SESSIONTIME" in the RAM 12 (S613). Following this, print data output along the IEEE 1394 line by the host computer are received via the IEEE 1394 controller 15 (S614). After the reception of print data has ended (S615) and a logout notification has been received from the host computer (S616), the communication process is terminated. Printing is then initiated by the printer engine 16 (S610).

If the received login identifier is not a "NULL", however, it is assumed that the request is for the continuous transmission of print data that has been halted, and a check is performed to determine whether the print data for the received login identifier are valid (S604). When the print data are not valid, an abnormal end notification is transmitted to the host computer to terminate the communication process (S605), the printer is initialized (S606), and the process at step S601 is repeated.

When the received print data are valid, permission for continuous reception is transmitted via the IEEE 1394 controller 15 and along the IEEE 1394 line to the host computer (S607), and the reception of print data from the host computer is resumed (S608). When the reception of data has been completed (S609) and a logout notification has been received from the host computer, the communication process is terminated (S616) and printing is initiated by the printer engine 16 (S610). Thereafter, the process at step S601 is repeated.

Figure 7:
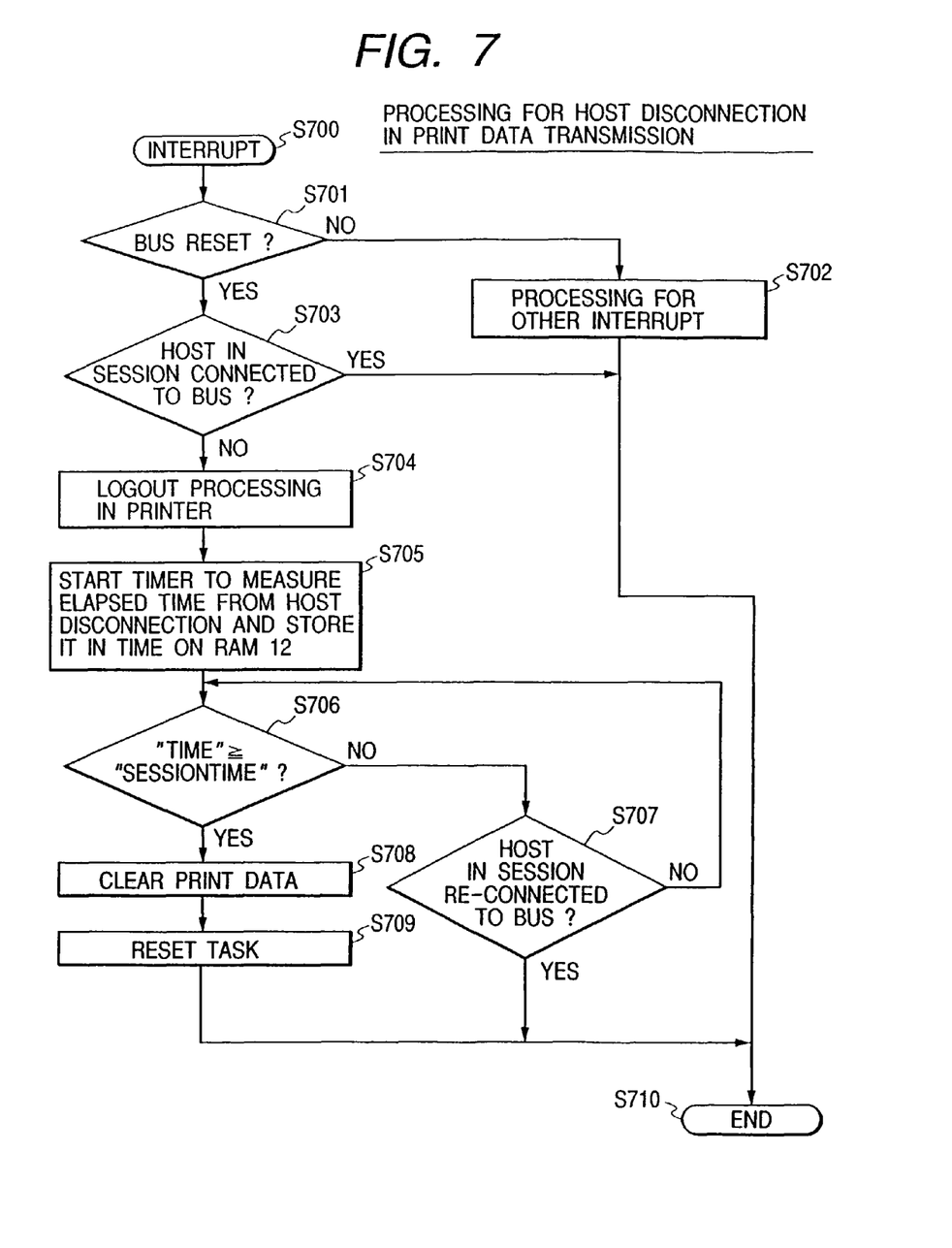
FIG. 7 is a flowchart showing the processing performed by the printer when the host computer is disconnected from the bus during the transmission of print data.

An explanation will now be given, while referring to FIG. 7, for the processing performed by the printer when the host computer is disconnected from the IEEE 1394 line during the transmission of print data.

This processing is performed by a program for processing an interrupt that occurs as the result of an IEEE 1394 bus reset.

When an interrupt has occurred (S700), a check is performed to determine whether the interrupt is the result of an IEEE 1394 bus reset (S701). If the interrupt is not the result of a bus reset, an interrupt routine that corresponds to the cause of the interrupt is activated, the appropriate processing is performed (S702), and the processing is thereafter terminated (S710). However, if the interrupt was the result of a bus reset, a check is performed to determine, via the IEEE 1394 controller 5 and the IEEE 1394 line, whether the host computer in the session is currently connected to the bus (S703). If the host computer in the session is connected to the bus, it is assumed that the bus reset has not adversely affected communication by the printer and the interrupt process is terminated (S710). If the host computer in the session is not connected, it is assumed that the host computer that was transmitting the data has been disconnected from the bus and a logout process is performed inside the printer (an abnormal end process) (S704). The timer for the printer is activated to measure the time that has elapsed since the host computer was disconnected from the bus, and the elapsed time is stored in area "TIME" in the RAM 12 (S705). Thereafter, the value stored in "TIME" is compared with the value stored in "SESSIONTIME" (S706).

If the value stored in "TIME"≧the value stored in "SESSIONTIME", it is assumed that the session time has expired and the print data that are stored in the printer are cleared (S708). Then, all the tasks concerning the transmission of print data are initialized (S709) and the processing is thereafter terminated (S710).

If the value stored in "TIME"<the value in "SESSIONTIME", it is assumed that the session time has not yet expired, and a check is performed to determine whether the host computer in the session has been reconnected to the bus (S707). If the host computer has not been re-connected, the process at step S706 is repeated.

If the host computer in the session has been reconnected, the processing is thereafter terminated (S710).

An explanation will now be given, while referring to FIG. 8, for the form of the present invention as it compares with an OSI (Open System Interconnection) seven layer model composed in accordance with the international standard.

The lower layer of the OSI seven layer model includes a physical layer, a data link layer, a network layer and a transport layer; and the upper layer includes a session layer, a presentation layer and an application layer. When the individual layers are compared with the means provided by the present invention, it is apparent that the functions of the upper layer are implemented by the control provided by the programs shown in FIG. 4 and FIGS. 5A and 5B, and that the functions of the lower layer are implemented by the control provided by SBP-2, as determined by IETF and by IEEE 1394.

(Second Embodiment)

While in the first embodiment the session time is set by a user, the session time can be fixed by a system. Further, in the first embodiment, the session time for the disconnection of the host computer from the bus is equal that for the disconnection of the printer. However, a different session time can be set for each case.

(Third Embodiment)

In the first embodiment, the IEEE 1394 line is employed by the host computer to transmit data to the printer. However, it can be easily understood that a great economical effect can be obtained when this control method is applied when transmitting a large amount of data along a line for which a transmission fee is charged.

According to the present invention, if a plurality of image sources and a plurality of printers can be connected to a single, closed communication line like the IEEE 1394, and if an image data source in a connection that is transmitting data is disconnected from the line, the printer can exchange data with another image source along another line so long as a predetermined time has expired.

Since the upper layer is not immediately disconnected upon the disconnection of the lower layer, even when the disconnection and the re-connection of a line occurs due to a careless mistake or the rearrangement of apparatuses by a user, the continuous transmission of data can be sustained so long as the line connection is re-established within a predetermined time. As a result, as concerns printing, paper, time and ink (toner) are not wasted.

According to the present invention, even if a line disconnection occurs, data received before then can be effectively employed.

What is claimed is:

1. A communication control apparatus comprising:
   a communicator that performs a login to a different apparatus and receives login identification information for identifying the login from the different apparatus if the login is successful; and
   a controller that, when connection on a lower layer of a communication with the different apparatus is disconnected while data is being transmitted to the different apparatus, permits an upper layer of the communication to maintain the login identification information for a predetermined period of time, and, when connection on the lower layer is re-established within the predetermined period of time, permits the upper layer to continue the transmission of data by using the maintained login identification information.

2. A communication control apparatus according to claim 1, wherein the predetermined time is entered by a user, said communication control apparatus further comprising:
   an accepting unit that accepts the predetermined time entered by the user; and
   a storage unit that stores a value indicating the predetermined time.

3. A communication control apparatus according to claim 1, wherein said controller comprises:
   a time determination unit that determines whether the predetermined time has elapsed;
   a reconnection determination unit that determines whether the different apparatus has been reconnected to a communication line;
   a login determination unit that, when said reconnection determination unit determines that the different apparatus has been reconnected before said time determination unit determines that the predetermined time has elapsed, determines whether a login to the different apparatus has been successful;
   a reception determination unit that, when said login determination unit determines that the login has been successful, determines whether the different apparatus is capable of continuous reception; and
   a transmission unit that, when said reception determination unit determines that continuous reception has been enabled, transmits data to the different apparatus by using the maintained login identification information.

4. A communication control apparatus according to claim 1, wherein said controller comprises:
   a time determination unit that determines whether the predetermined time has elapsed; and
   a clearing unit that, when said time determination unit determines that the predetermined time has elapsed, clears data that are being transmitted to the different apparatus.

5. A communication control apparatus according to claim 1, wherein said lower layer is a layer for ensuring the transmission of data, and detects a line disconnection or a line abnormality and performs a line disconnection process.

6. A communication control apparatus according to claim 1, wherein said lower layer includes a transport layer defined in an OSI layer 7 standard and below, and said upper layer includes a session layer defined in said OSI layer 7 standard and above.

7. A communication control apparatus according to claim 6, wherein SBP-2 is employed as a protocol for said transport layer and below.

8. A communication control apparatus according to claim 1, wherein IEEE 1394 is employed as a physical layer, which is the lowest layer of the lower layer.

9. A communication control apparatus according to claim 1, wherein said apparatus is a computer, and the different apparatus is a printer.

10. A communication control apparatus according to claim 1, wherein disconnection of said lower layer occurs when said different apparatus is physically disconnected from a communication line, or when a new apparatus is connected to said communication line.

11. A communication control method comprising:
    a login step of performing, at one apparatus, a login to another apparatus;
    a reception step of receiving, at the one apparatus, login identification information for identifying the login from the another apparatus if the login is successful; and
    a control step of controlling, at the one apparatus, an upper layer of a communication such that, when connection on a lower layer of the communication is disconnected while data is being transmitted from the one apparatus to the another apparatus, the upper layer is permitted to maintain the login identification information for a predetermined period of time, and, when connection on the lower layer is re-established within the predetermined period of time, the upper layer is permitted to continue the transmission of data by using the maintained login identification information.

12. A communication control method according to claim 11, wherein the predetermined time is entered by a user, said method further comprising:
    an accepting step of accepting the predetermined time entered by the user; and
    a storage step of storing a value indicating the predetermined time in a memory.

13. A communication control method according to claim 11, wherein said controlling step comprises:
    a time determination step of determining whether the predetermined time has elapsed;
    a reconnection determination step of determining whether the another apparatus has been reconnected to a communication line;
    a login determination step of, when it is determined at said reconnection determination step that the another apparatus has been reconnected before it is determined at said time determination step that the predetermined time has elapsed, determining whether a login to the another apparatus has been successful;
    a reception determination step of, when it is determined at said login determination step that the login has been successful, determining whether the another apparatus is capable of continuous reception; and
    a transmission step of when it is determined at said reception determination step that continuous reception has been enabled, transmitting data to the another apparatus by using the maintained login identification information.

14. A communication control method according to claim 11, wherein said controlling step comprises:
    a time determination step of determining whether the predetermined time has elapsed; and
    a clearing step of, when it is determined at said time determination step that the predetermined time has elapsed, clearing data that are being transmitted from the one apparatus to the another apparatus.

15. A communication control method according to claim 11, wherein said lower layer is a layer for ensuring the transmission of data, and detects a line disconnection or a line abnormality and performs a line disconnection process.

16. A communication control method according to claim 11, wherein said lower layer includes a transport layer defined in an OSI layer 7 standard and below, and said upper layer includes a session layer defined in said OSI layer 7 standard and above.

17. A communication control method according to claim 16, wherein SBP-2 is employed as a protocol for said transport layer and below.

18. A communication control method according to claim 11, wherein IEEE 1394 is employed as a physical layer, which is the lowest layer of the lower layer.

19. A communication control method according to claim 11, wherein said method is executed by a computer, and the another apparatus is a printer.

20. A communication control method according to claim 11, wherein disconnection of said lower layer occurs when said another apparatus is physically disconnected from a communication line, or when a new apparatus is connected to said communication line.

21. A computer-readable storage medium on which is stored a communication control program executed by a control apparatus, said communication control program comprising computer-executable code for the control apparatus to perform the steps of:
- a login step of performing a login to another apparatus;
- a reception step of receiving login identification information for identifying the login from the another apparatus if the login is successful; and
- a control step of, when connection on a lower layer of a communication with the another apparatus is disconnected while data is being transmitted to the another apparatus, permits an upper layer of the communication to maintain the login identification information for a predetermined period of time, and, when connection on the lower layer is re-established within the predetermined period of time, permits the upper layer to continue the transmission of data by using the maintained login identification information.

* * * * *

UNITED STATES PATENT AND TRADEMARK OFFICE
CERTIFICATE OF CORRECTION

PATENT NO. : 7,143,172 B2
APPLICATION NO. : 10/635567
DATED : November 28, 2006
INVENTOR(S) : Isoda It is certified that error appears in the above-identified patent and that said Letters Patent is hereby corrected as shown below:

COLUMN 8:
Line 53, "of" should read -- of, --.

COLUMN 10:
Line 13, "permits" should read -- permitting --; and
Line 17, "permits" should read -- permitting --.

Signed and Sealed this

Eighteenth Day of March, 2008

JON W. DUDAS
*Director of the United States Patent and Trademark Office*